US005604038A

United States Patent [19]
Denes et al.

[11] Patent Number: 5,604,038
[45] Date of Patent: Feb. 18, 1997

[54] POLYMERIC THIN LAYER MATERIALS

[75] Inventors: Ferencz S. Denes; Raymond A. Young; Abdolmajid Sarmadi; J. Leon Shohet, all of Madison, Wis.

[73] Assignee: Wisconsin Alumni Research Foundation, Madison, Wis.

[21] Appl. No.: 341,790

[22] Filed: Nov. 18, 1994

[51] Int. Cl.$^6$ .............. B32B 17/10; B32B 15/08
[52] U.S. Cl. .......... 428/429; 428/450; 428/451; 428/452; 428/457; 428/461; 428/500; 428/511; 428/688; 428/698; 428/702; 428/704
[58] Field of Search .............. 427/489, 495, 427/539, 574; 428/411.1, 429, 450, 451, 452, 457, 461, 500, 511, 688, 698, 702, 704

[56] References Cited

U.S. PATENT DOCUMENTS

| | | | |
|---|---|---|---|
| 3,169,914 | 8/1960 | Young et al. | 204/164 |
| 3,573,192 | 8/1968 | Bersin et al. | 422/186.05 |
| 3,607,714 | 9/1971 | Vialaron | 422/186.29 |
| 3,954,954 | 5/1976 | Davis et al. | 423/492 |
| 4,016,448 | 4/1977 | Nighan et al. | 313/231.01 |
| 4,735,832 | 4/1988 | Ichikawa et al. | 428/36.6 |
| 4,942,073 | 7/1990 | Era et al. | 428/64 |
| 4,980,235 | 12/1990 | Scheer et al. | 428/421 |
| 5,000,831 | 3/1991 | Osawa et al. | 204/173 |
| 5,304,255 | 4/1994 | Li et al. | 136/257 |
| 5,422,177 | 6/1995 | Fukuda et al. | 428/336 |

FOREIGN PATENT DOCUMENTS 402129921A 5/1990 Japan.

OTHER PUBLICATIONS

Simionescu et al., "The Synthesis of Polyacetylene–Type Polymers Under Dense–Medium Plasma Conditions," *Advances in Low–Temperature Plasma Chemistry, Technology, Applications—Vol. 3 TECHNOMIC* Abstract Mar. 1991.

Primary Examiner—D. S. Nakarani

[57] ABSTRACT

Liquid phase polymers deposited upon a substrate are cross-linked in the presence of a non-polymer-forming gas plasma to produce solid polymer coatings having improved chemical, thermal, and mechanical properties. The properties of the polymer layers formed in the method may be exploited by producing microelectronic circuitry, optical materials, and barrier coatings for a variety of substrate materials.

14 Claims, 7 Drawing Sheets

5,604,038

POLYMERIC THIN LAYER MATERIALS

STATEMENT OF GOVERNMENT SUPPORT

This invention was made with United States government support awarded by NSF Grate #CDR 8721545. This United States Government has certain rights in this invention.

FIELD OF THE INVENTION

The present invention relates to polymeric thin layers and in particular to a method for depositing polymeric materials onto substrates and to novel polymeric materials.

BACKGROUND OF THE INVENTION

Modern technologies including miniaturization, microelectronics, nonlinear optics, solar energy accumulation and conversion, and others have stimulated an increasing demand for ultrathin polymer film materials.

Plasma thin films are now generated in one of two standard ways. First, gas phase monomers are induced by plasma activation to polymerize onto a substrate at free radical sites. Alternatively, polymer-like molecules in the gas phase are exposed to a high energy plasma whereupon the molecules fragment and disassociate randomly and then form an irregular structure as individual random fragments are interlinked onto a substrate at free radical sites. During conventional cross-linking processes (curing and post-curing reactions), polymer films develop three-dimensional networks but as a result of significant topographical reorganizations, the deposited materials develop cracks that can cause drifts and interruptions in metal circuitry and can result in structural failure in other materials.

The selection of a polymer thin film for a specific application is generally dictated by a combination of properties such as electrical, thermal and mechanical characteristics and by the processing behavior of these materials.

During the fabrication of electronic or optical devices, polymer films must survive in hostile thermal (thermal cycling), chemical (exposure to solvents and curing agents), mechanical (scratching, bending) and sometime radiation (photo bleaching, ion beam technologies) environments and maintain their characteristics of modulus, thermal expansion and fluid transport in the polymer within certain limits. Inability to maintain these parameters leads to undesired phenomena like delamination, cracking, etc. Residual stress also represents a significant obstacle in ultrathin film applications.

In the field of barrier coatings, cracking and permeability of barrier layers are common problems that arise from inherent structural weaknesses in the barrier materials, when materials are deposited using the standard plasma thin film deposition methods.

In the field of microelectronic technologies, the development of high-density interconnections through multi-layer, multi-chip packages is essential to propagate high-speed signals with minimal delay and distortion. The electrical functionality, heat dissipation, and environmental reliability properties of the products depend directly on the structural characteristics of sandwiched polymeric layers. Conventional technologies in this field are based mainly on processible polyamide derivatives with good heat resistance, mechanical stability, chemical inertness and relatively low dielectric constant, rather than on inorganic materials such as alumina, glass or quartz. In the case of ultrathin polymeric films, the interlayer interface properties are more important than the bulk properties. These insulating polymeric films are located in a multilayer metal-polymer structure built on top of glass, alumina, silicon dioxide or ceramic substrates. However, since these substrates often contain contaminants such as solvents, trapped air or ions, the adhesion of films to substrates can be impaired. Consequently, novel deposition techniques need to be developed to produce uniform, clear polymeric thin films for strong bonding with the substrate.

SUMMARY OF THE INVENTION

The present invention is summarized in that a method for forming a novel three-dimensional polymeric network includes the steps of depositing a liquid phase viscous polymer onto a cleaned and degassed substrate in a reactor, introducing a non-polymer-forming gas into the reactor at a pressure and flow rate sufficiently high to form a plasma when ignited, igniting the gas to form a plasma, and applying sufficient RF power to maintain the plasma until a three-dimensional network of cross-linked polymer structure forms.

The present invention is also summarized in that the polymer network formed is a genuine cross-linkage of intact polymer units insofar as the backbone of the polymer unit is maintained in the network structure. The cross-linkages between polymer units form between polymer side chains. Unlike conventional gas-phase polymer coatings, the polymer network of the present invention does not result from the random fragmentation, dissociation and interlinkage of the polymer unit backbone.

It is an object of the present invention to provide an improved polymer thin layer that overcome the adhesion and durability limitations of existing thin films.

It is another object of the present invention to provide a method for forming the improved polymer network of the present invention.

It is an advantage of this method is that it allows one to employ many temperature-sensitive substrates that previously could not have withstood the gas plasma deposition temperatures of earlier plasma thin film methods.

It is another advantage of the present invention that the polymer network formed exhibits improved substrate adhesion when compared to existing plasma-induced polymeric thin films.

It is yet another advantage of the present invention that the cross-linked polymer network exhibits excellent thermal stability, chemical inertness, and transparency, and uniformity superior to conventional plasma thin films.

It is a further advantage of the present invention that the cross-linked polymer networks are mechanically strong and resistant to the effects of radiation.

It is a feature of the present invention that the starting polymer deposited upon a substrate is in the liquid phase. An advantage of this process is that no solvent is required in the deposition process. Solvents often cause subsequent film delamination. It is the belief of the applicants that all plasma-induced polymerization has heretofore utilized gas-phase monomers or polymers as the deposited material.

Other objects, advantages and features of the present invention will become apparent upon consideration of the following detailed description read in conjunction with the accompanying drawings.

DETAILED DESCRIPTION OF THE INVENTION

Figure 1:
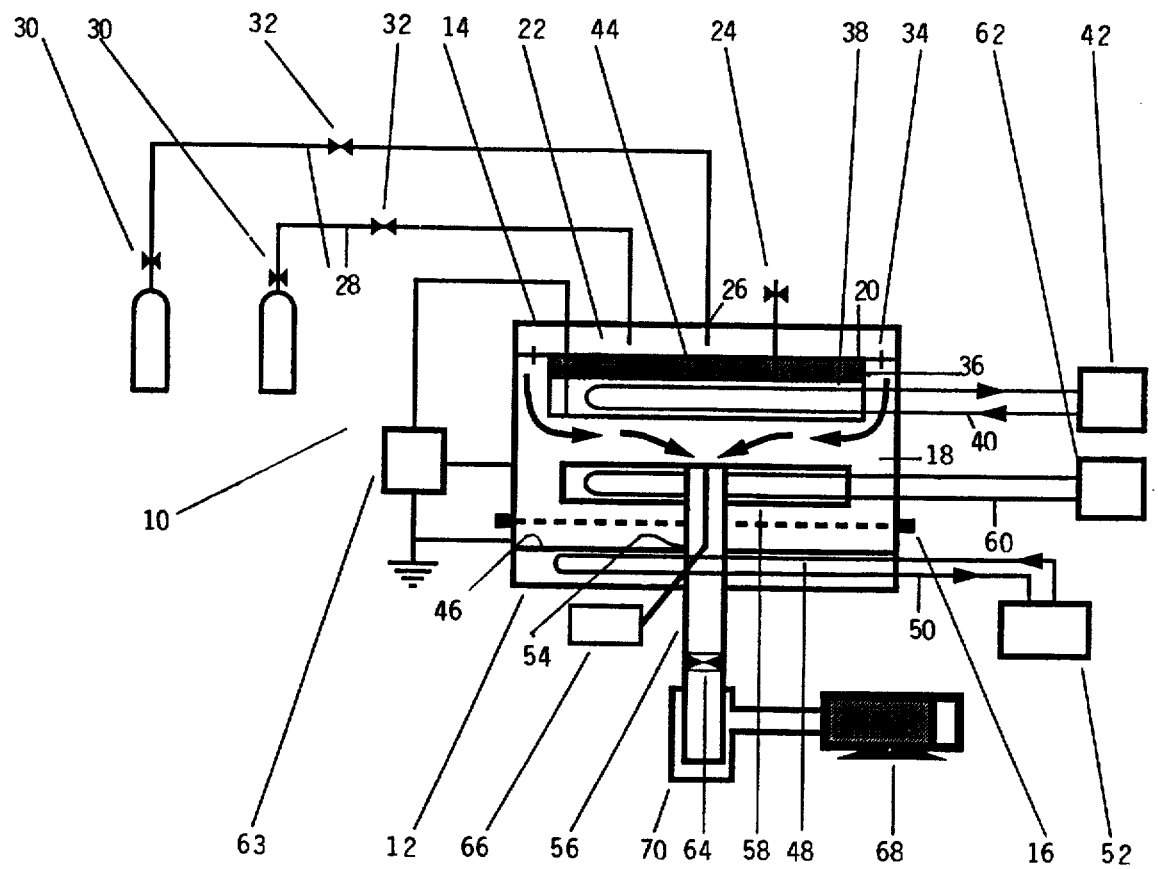
FIG. 1 depicts an apparatus useful for performing the method of the present invention for depositing a polymer onto a substrate.
Figure 2:
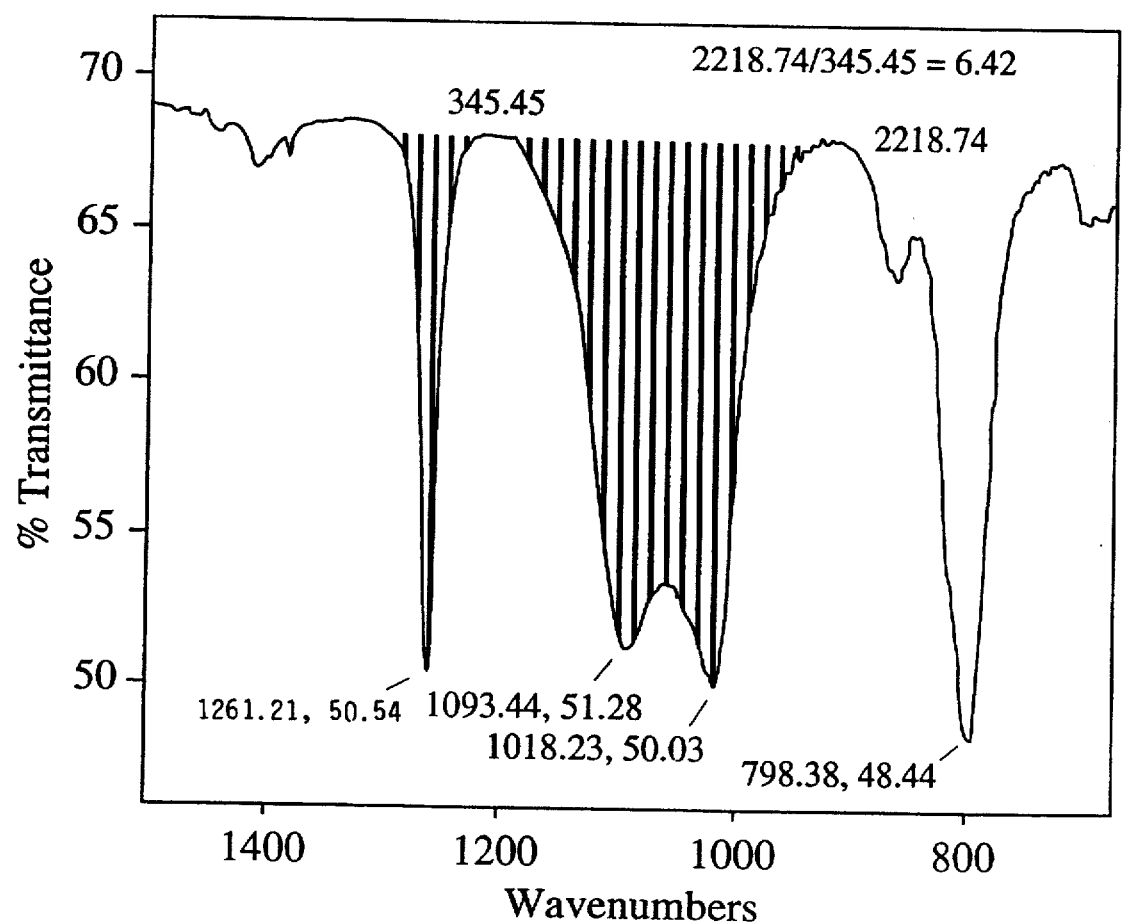
FIGS. 2 and 3 depict the FTIR measurements of the Si—O backbone and Si—C backbone-side chain bond vibration patterns of plasma-treated solid phase polymers and the corresponding polysiloxane polymer units before deposition, respectively.

In the method of the present invention, a viscous liquid phase polymer with a linear backbone and having a low vapor pressure is deposited onto a substrate and exposed to a plasma field under conditions of temperature and pressure that promote the cross-linking of the polymer into a durable layer on the substrate surface. During plasma discharge, the polymer chains become cross-linked through their side groups, thereby converting the liquid phase into a solid phase polymer having extreme thermal, chemical, and mechanical stability. The solid layers thus formed are smooth and transparent in both the UV and visible wavelength regions.

"Backbone" is intended in this patent application to mean the portion of the polymer molecule that remains when side groups have been removed or modified therefrom. "Linear backbone" is intended to mean that each component element of the backbone is connected to exactly two other elements, except the elements at the polymer termini, which are each joined to only one other element. Linear backbones are unbranched. In the polymer structure set forth herein, joined elements $(-A-B-)_n$ form the linear backbone.

The liquid phase polymers useful in the present invention are high molecular weight material that can exist in a liquid form at a deposition temperature suitable for a desired substrate and that have a vapor pressure sufficiently low that the material does not vaporize appreciably at pressures between 10 and 1000 mTorr. When the polymeric networks of the present invention are used as microelectronic layers, it is desirable that the polymer have a low dielectric constant, preferably below 3. As the viscosity of a polymer varies non-linearly with the temperature, it is not possible to identify a preferred viscosity range, except insofar as it is desired that the viscosity be such that the polymer is able to uniformly coat the desired substrate. To facilitate substrate coating after deposition of the liquid polymer, the polymer viscosity can be adjusted by heating the polymer-coated substrate to a temperature that is sufficiently high that the polymer flows freely over the substrate but not so high as to destroy or degrade the substrate or the polymer.

The suitable liquid polymer can be a single polymer or can be a colloidal blend of polymers. The polymer can also be impregnated with metallic or non-metallic materials that confer desired properties to the coating. As a non-limiting example, one or more dyes that fluoresce under light of particular wavelengths could be included in the polymer coating as an indicator of authenticity. Similarly, other dopants that affect the non-linear optical properties of the cross-linked material could be added.

The polymer needs to exist in a liquid form only to facilitate its distribution onto the substrate during the deposition step of the method. It is, therefore, possible to select a polymer that assumes a solid state after being deposited. It is also possible to furnish the polymer in a volatile liquid solvent such that the polymer is applied to the substrate in liquid form before the solvent evaporates, leaving the deposited polymer behind for cross-linking. This approach permits the use of additional polymers that would otherwise be solid at suitable deposition temperatures. However, this approach is less preferred because of the opportunity for residual solvent to affect the cross-linked polymer properties. This approach could, in effect, re-introduce detrimental contaminants removed during substrate cleaning. It is preferred, but not essential, that the liquid polymer coat the substrate uniformly.

The polymer backbones are repeating units of the form

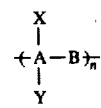

where A is silicon, phosphorus, sulfur, boron or carbon, and B is oxygen, carbon, or nitrogen. The side chains, X and Y, can be of any structure that can be modified by the plasma energy to achieve cross-linking between polymers. The side chains can be, for example, hydrogen, branched or linear, lower or higher aliphatic chains, aromatic ring structures, halogens, and the like. The number of side chains, X and Y, depend upon the number of available bond sites on A. A and B form a linear backbone of n repeats and where organic side chains, designated generally as X and Y, are attached to A. The number of repeats, n, is preferably greater than 10, although oligomers as short as 5 repeat units are also envisioned to work within the present invention. The maximum number of repeats in a polymer preparation varies from molecule to molecule and cannot be determined accurately. The length of the polymer is less important than its viscosity. As is discussed elsewhere in the application, a suitable viscosity is any that permits the polymer to coat a substrate. It is also understood that a suitable viscosity can be obtained by heating a polymer that is too viscous at room temperature to coat the substrate. Room temperature in this application is intended to mean temperatures approximately in the range of 20° C. to 30° C., preferably about 25° C.

Cross-linking can be achieved by dehydrogenation or dehalogenation of the X and/or Y side chains by a cross-linking material, M, followed by X-M-X linking or Y-M-Y linking, or by complete removal of X and/or Y followed by direct cross-linking between backbones by cross-linking material M. Depending upon the plasma energy applied, the cross-linked polymers formed will generally exhibit some combination of the two types of cross-linking. The cross-linking material is a material that is a gas under plasma conditions, which gas has a plasma-reactive species that is at least bivalent. A "reactive species" causes the removal of side chain groups, in whole or in part, and substitutes itself for the removed groups of two polymer molecules, thereby providing a structure for cross-linking two polymer molecules together. The cross-linking material is preferably oxygen, nitrogen, boron, ammonia, or hydrazine gas. When oxygen gas is the material used to cross-link polysiloxanes, the resulting cross-linked material is quartz-like in structure with predominantly $(Si-O)_x$ units.

The cross-linking plasma material can be augmented with volatile organometallic compounds to achieve integral implantation of such compounds into the polymer layer. This can impart particular optical and conductivity advantages to the cross-linked polymers formed. By adjusting the amount of volatile organometallic compounds in the gas one can readily control the extent to which metal particles are introduced into the cross-linked polymer layer. The organometallic compounds can be delivered directly in the gas stream or can be removably coated onto a surface of the reaction chamber.

The present method uses energy of a gas plasma to induce inter-polymer cross-links across side chains without inducing intra-polymer cleavages. It is, therefore, important that the bonds between A and B, and the bonds between backbone repeat units, be sufficiently strong to remain unbroken by the cross-linking plasma energy. It is understood by those in the art that certain bonds, such as Si—O and Si—N, can survive plasma cross-linking energies even at room temperature, while other, weaker bonds, such as C—C bonds can survive intact only at lower temperatures where molecular vibration is reduced. In such cases, temperatures near or below the glass transition temperature, $T_g$, are preferred. Therefore, upon consideration of the structure of a selected polymer, one of ordinary skill practicing the invention will be able to balance the power level and temperature to arrive at conditions suitable for cross-linking the selected polymer.

Examples of preferred polymers include linear, liquid-phase polysiloxanes having a viscosity in the range of 10 to 100,000 centistokes at room temperature. Generally, polysiloxane compounds are depicted as $(-SiX_2-O-)_n$, where X is a side chain of one or more substituents. The linear backbone of such polysiloxane polymers is $(-Si-O-)_n$. Other appropriate polymers include polyolefins, paraffin oil, polysulfones, polysulfides, polysilazenes, polyethers (e.g. polyoxymethylene) and polyphosphazenes.

The choice of substrate is not intended to limit the scope of the invention. Any solid substrate onto which the polymer can be deposited is an appropriate substrate. Since the polymer is deposited onto the substrate in a liquid form, deposition is often uniform throughout and, therefore, substrates of any shape are appropriate without concern for non-uniform deposition. Preferred substrates include metal, glass, paper, synthetic polymers, silicon, alumina, quartz, potassium bromide, or ceramic. When considering the suitability of a polymer/substrate combination it is important to keep in mind that the substrate must be stable under the conditions (e.g., power, temperature, pressure) appropriate for cross-linking the selected polymer.

FIG. 1 depicts a cylindrical RF (30 Kc) capacitively-coupled parallel plate stainless steel plasma reactor 10 suitable for carrying out the method of the present invention. This type of reactor is commercially available. The method can be practiced in plasma reactors other than that shown, as long as the reactor provides user access to the substrate, and an ability to regulate gas flow into and out of the reactor, and as needed, temperature. A 30 Kc RF generator, external to the reactor itself, is adequate to deposit the polymeric layers of the present invention. The RF generator used must have adequate power to cause cross-linking of the chains, but must not be so high as to fragment the polymer backbones to any appreciable extent. Power ranges of 60 W to 400 W are suitable, with preferred power in the range of 80 W to 150 W.

The stainless steel reactor includes a fixed and rigid lower part 12 and an openable upper part 14 that permits easy handling of substrates and polymer samples. The upper part 14 and lower part 12 of the cylindrical stainless steel reactor 10 are reversibly joined together with a circular O-ring sealing system 16. When joined, the upper 14 and lower parts 12 define in their interior portion a plasma discharge chamber 18.

Provided within, and toward the top of, the upper part 14 of the reactor 10 is a circular upper barrier plate 20 that, with the inner surface of the upper part 14 of the reactor 10, defines a gas mixing chamber 22 above the plasma discharge chamber 18. Passing from the gas mixing chamber 22 through the top of the upper part 14 are a vent valve 24 and a plurality of gas inlet orifices 26. Inlet gas lines 28 connect the gas inlet orifices 26 to external sources of plasma-forming, non-polymer forming gases 30. Flow meters 32 are provided on the inlet gas lines 28.

Near the perimeter of the circular upper barrier plate 20, a plurality of gas orifices 34 in a circular arrangement pass through the upper barrier plate 20 and bring the gas mixing chamber 22 and the plasma discharge chamber 18 into fluid communication.

Within the plasma discharge chamber 18, and attached to the underside of the upper barrier plate 20 is a hollow cylindrical upper stainless steel electrode 36. The hollow interior of the upper electrode 36 forms a first thermostating chamber 38 that includes a temperature regulator 40 that is itself attached to an external thermostat 42. Between the thermostating chamber 38 of the upper electrode 36 and the upper barrier plate 20 is an insulating layer 44 that thermally isolates the upper electrode 36 from the gas mixing chamber 22.

A circular lower barrier plate 46 is provided within the lower part 12 of the reactor 10. The lower barrier plate 46, with the inner surface of the lower part 12 of the reactor 10, defines a second thermostating chamber 48. Disposed within the second thermostating chamber 48 is a temperature regulating element 50 attached to an external thermostat 52.

The circular lower barrier plate 46 is provided with central orifice 54 on the cylindrical axis of the reactor 10 into which a stainless steel connecting tube 56 is attached. The connecting tube 56, open at both ends, enters the lower part 12 of the reactor 10 from beneath the apparatus 10 and passes through the central orifice 54 of the lower barrier plate 46 such that one end of the tube is external to the reactor 10 and the other end is internal.

A cylindrical lower stainless steel electrode 58 is connected to the connecting tube 56, its upper surface being flush with the internal end. In the hollow lower electrode 58 is a temperature regulating element 60 attached to an external thermostat 62. The upper electrode 36 and the lower electrode 58 are electrically connected to an external, grounded RF (30 kC) generator 63.

The internal end of the connecting tube 56 is equidistant from the gas orifices 34 that pass through the upper barrier plate 20. Positioned within the stainless steel connecting tube 56 is a large capacity valve 64 for regulating pressure within the reactor 10. Also within the stainless steel connecting tube 56 and positioned above the large capacity valve 64 is a pressure monitor 66 attached to an external display (not shown) for visualizing pressure levels within the reactor 10.

An external mechanical vacuum pump 68 is in fluid connection with the external end of the stainless steel connecting tube 56. Between the external end of the connecting tube 56 and the pump 68 is a liquid nitrogen trap 70 for condensing gases withdrawn from the reactor.

The method for depositing a polymer onto a substrate begins by degassing and cleaning the substrate using an inert gas. The gas selected for the substrate cleaning stage can be any inert gas that is non-reactive and non-polymer-forming.

The phrase "non-reactive and non-polymer forming" is intended to refer to gases that do not interact chemically with the reactor or with the substrate and which do not themselves join together to form polymeric molecules in a plasma field under the conditions used. It is intended that such gases act merely to clean and degas the substrate and reactor, leaving no residue or coating on the substrate or reactor surfaces.

The upper part 14 of the reactor 10 is opened and the suitable substrate is positioned on the lower electrode 58. The reactor 10 is closed and is evacuated to ground pressure level. The selected inert gas, such as argon, is then introduced via the gas line 28 from one of the external gas sources 30 through the gas inlet orifices 26 into the gas mixing chamber 22. The vacuum pump 68 is started and gas is drawn from the gas mixing chamber 22 through the orifices 34 in the upper barrier plate 20 into the plasma discharge chamber 18.

Pressure inside the discharge chamber 18 is adjusted by balancing the flow into the chamber 18 and the flow out of the chamber 18 through the large capacity valve 64. When the pressure reaches a desired level in the plasma discharge chamber 18, the RF generator 63 is activated and an argon plasma is maintained at a temperature and for a time sufficient to clean and degas the substrate, which must be empirically determined for each substrate. The elevated temperature of this step helps to free gas trapped in substrate pores and to open the pores to receive the liquid polymer. Consideration must be given to the temperature exposure limits of the substrate. Afterwards, the reactor 10 is vented.

The reactor 10 is opened and the selected liquid phase polymer is then deposited manually or automatically onto the substrate. Depending upon the size and shape of the substrate, any of a number of known methods can be used to coat the polymer onto the substrate. These include, but are not limited to, dipping, rolling, centrifuging, and painting. Unlike gas deposition of plasma thin films, the liquid phase polymers are deposited only on the substrates. There is no undesired deposition of the polymer on the reactor walls.

As described above, many suitable polymers can be applied as a liquid at room temperature, though some are heated to temperatures above room temperature to achieve the noted viscosity and flow properties. However, it is important not to heat the polymer or substrate to a temperature at which it is destroyed.

The amount of polymer deposited determines the ultimate thickness and durability of the solid polymer layer. Typically, a single polymer treatment yields a cross-linked layer of approximately 250–1000 Angstroms. By reducing the amount of polymer, layers as thin as a few Angstroms can be deposited, although it can be difficult to measure accurately a thickness less than 100 Angstroms. Because it is preferred that the cross-linking reactive species in the plasma have access to the entire thickness of the polymer layer, rather than just the surface, it is preferred that each polymer layer be no thicker than about 1000 Angstroms. However, if thicker coatings are desired, it is possible to repeatedly perform the deposition/cross-linking steps of the process. There is no theoretical limit to the number of polymer layers that can be applied sequentially to a substrate.

Because the polymer is applied directly to the substrate, rather than deposited from the plasma gas itself, the ability to deposit the polymer layer uniformly does not depend upon pressure or other gradients within the plasma reactor, as is known to be the case with conventional plasma thin film depositions. The deposition of the polymer in this method depends only upon the surface tension and deposition temperature of the polymer.

After the polymer has been applied to the substrate surface, the substrate is again placed onto the lower electrode 58 and the upper 14 and lower 12 parts of the reactor 10 are again joined together. The polymer is allowed sufficient time to coat the substrate. The time required to coat the substrate will vary with the viscosity of the polymer. To speed coating, the substrate and polymer can be heated (again, to a non-destructive temperature).

When the coating is applied, the temperature of the substrate is adjusted to a suitable reaction temperature. As noted, the temperature can be room temperature but may need to be lower to prevent backbone fracture. At lower temperatures, preferably temperatures near or below $T_g$, increased cross-linkage during polymerization is observed. The increased cross-linking is desired in that the solid polymer formed in the process exhibits better stability at higher temperatures than have previously been observed.

When an appropriate temperature has been achieved, the cross-linking material is introduced into the reactor 10. If the material is a gas at ambient conditions, as is preferred, it is introduced from the external gas source 30 into the gas mixing chamber 22 and then into the plasma discharge chamber 18. If the material is a solid at ambient conditions, it is introduced into the reactor 10 when the coated substrate is placed therein.

By adjusting the large capacity valve 64 in the connecting tube 56 and the flow rate of the inlet gas, the pressure and flow rate of the plasma gas in the reactor is controlled. Suitable flow rates range from 1 to 50 sccm, with a preferred range of 2 to 10 sccm. At excessively high flow rates, reactive species are withdrawn from the reactor before cross-linking. At very low flow rates the polymer and substrate are damaged by heat build-up in the reactor 10. Suitable pressures are in the range of 60–500 mTorr. When the gas pressure and flow rate are adequate for plasma formation, the RF generator is activated for an time adequate to achieve a desired amount of cross-linking of the liquid polymer units sufficient for the intended application. The flow rate and pressure are also dependent upon the size and shape of the reactor and the dissociation characteristics of the selected gas in the plasma state. The interrelationship of these factors are understood in the art and can be taken into account when forming the cross-linking plasma. Desired flow rates and pressures can also readily be determined empirically as a routine experimental design step.

The transition of the deposited polymer from liquid phase to solid phase during cross-linking can be observed visually or by touch. In addition, chemical analysis can confirm cross-linking by showing dehydrogenation of organic side chains, or by showing the existence of linkages between side chains, or by showing the incorporation into the layer of the cross-linking gas.

When compared to conventional plasma thin films, the polymer layers generated by the present method exhibit improved adhesion to the substrate, improved thermostability, flexibility, smoothness, transparency and uniformity. The polymer networks formed in the present method have characteristics similar to inorganic polymers such as quartz or silicon dioxide, although the film forming properties are comparable or better to those inorganic polymers. As the extent of cross-linking increases in a particular reaction, more of the side chains are completely removed and the structure of the resulting material approaches that of the corresponding inorganic material, such as quartz.

The polymer layers formed in the method of the present invention find utility in many applications. These include any application in which a standard gas-deposited thin film can be used. In addition, because of the uniformity that can be achieved in the deposited polymer, and the improved thermal, chemical, and mechanical qualities and the ability to bond tightly to the substrate, these polymer layers find particular utility for development of multilayer microelectronic materials, optical devices, and coatings for organic and inorganic materials.

In the field of microelectronics, these layers can replace the low dielectric constant processible polyamide derivatives now used in multilayer metal-polymer multichip packages. The novel materials can have very low dielectric constants and yet do not suffer the adhesion problems caused by contaminants in polyamide derivatives.

The success of optical devices depends largely upon adequate photon conductivity. One promising possibility in this field is the development of thin film materials that exhibit significant nonlinear optical (NLO) effects. Materials that exhibit third-order NLO effects, for instance, do not transmit light until the light intensity of the incoming beam is greater than a certain threshold level. Gates created of such materials can permit or prohibit the transmission of light beams, depending upon the intensity of the incoming light. The light intensity can be readily controlled by modifying, for example, the output of a laser source, or by regulating the number of pulses that reach the gate at the same time. The development of nonlinear optical systems are critical to the design of efficient optical computers.

At present, nanocomposite materials based on metals or semiconductors, for instance, exhibit NLO effects. The interactions developed between a nanocluster and polymeric-host surfaces can facilitate the responsiveness to photonic interaction. The materials of the present invention can meet the required characteristics of an NLO material including uniformity, high purity, thermal and optical stability, and optical transparency.

As coatings, these materials are particularly useful as high density, chemically inert, transparent, and thin coatings for electronics and optical instrument components such as prisms and lenses. Also, because of the strength of the materials, the materials also offer abrasion resistance and protection from chemical and physical degradative forces including solvents, pH extremes and temperature extremes. The materials are also quite flexible yet resistant to cracking and delamination. As a result, another useful application is as a coating for flexible materials such as paper that remains in use for long periods of time and is subject to abuse. In particular, it is envisioned that the thin polymer layers are particularly well suited as coatings for currency, providing the currency with resistance to the damaging effects of use and markedly extending the lifetime of individual pieces of currency, without perceptible difference in the look or feel of the currency.

The materials can also provide barrier coatings for various packaging to protect packaged products from the influence of outside forces such as air. This application is envisioned to include packaging for food and beverages. The materials can provide a barrier between packaging materials and food products or can prevent outside air from passing through plastic coatings and damaging the food or beverage material inside. In particular, because the cross-linked polymer layers of the present invention are virtually airtight, the materials will find application in packaging for products that are particularly sensitive to air, such as beer. Such products have heretofore not been available in plastic containers because existing plastic containers cannot offer adequate airtight shelf life. In addition, the high chemical resistance of the materials makes them appropriate as barrier liners inside fuel containers.

Because of the integrity of the material for very long periods of time, it is also envisioned that the materials will find utility as coatings for biomedical devices such as heart valves, replacement joints, and artificial fluid channels without the risk of degradation over the course of the useful life of the devices. Finally, the materials can also coat textile goods such as threads or fabrics, providing a waterproofing capability.

The preceding paragraphs demonstrate the wide range of substrates upon which the method can be practiced. Because the possible substrates can vary in both size and economic value, it is also intended that the method can be practiced in a less sophisticated apparatus than that shown in FIG. 1. It is anticipated, for example, that lower value-added materials can be made using a plasma torch rather than an enclosed chamber.

The invention will be more readily understood upon consideration of the following examples which are intended to be purely exemplary of the invention. The examples are demonstrative of the technology, but do not represent optimized experimental procedures.

EXAMPLES

EXAMPLE 1

Formation of Polymeric Layer

A silicon wafer (7.62 cm in diameter) was positioned on the lower electrode of the apparatus shown in FIG. 1 and the reactor was closed. The system was evacuated to a ground pressure level of 90 mTorr. Argon gas was introduced into the reaction chamber and an argon plasma was ignited for ten minutes to remove possible contaminants. The lower electrode and the substrate were heated from 25° C. to 50° C. over the course of ten minutes and were then allowed to cool down to room temperature.

The reactor was opened and polydimethylsiloxane (viscosity 100,000 centistokes) was deposited as a thin film on the silicon wafer substrate. The chamber was closed and the 90 mTorr ground pressure level was reestablished and the electrode and the polymer-covered substrate were heated again to 150° C. to allow the polymer to coat the silicon wafer uniformly. The polymer-coated substrate was then cooled down to room temperature. Oxygen was then introduced into the reactor until the pressure reached 180 mTorr and the flow rate reached 10 sccm. The oxygen plasma was then ignited and an RF power of 109 W was dissipated to the electrodes. The plasma treatment continued for 20 minutes. At the end of the reaction, the reactor was repressurized to atmospheric pressure and the sample was removed and analyzed.

EXAMPLE 2

Analysis of Polymeric Layer

The polymeric layer thus formed was uniformly smooth and transparent. When deposited on glass, quartz, or KBr pellets, the polymers have a pale yellowish color and are essentially transparent in both UV and visible wavelength regions although a low intensity shoulder can be observed at about 350 nm.

Figure 3:
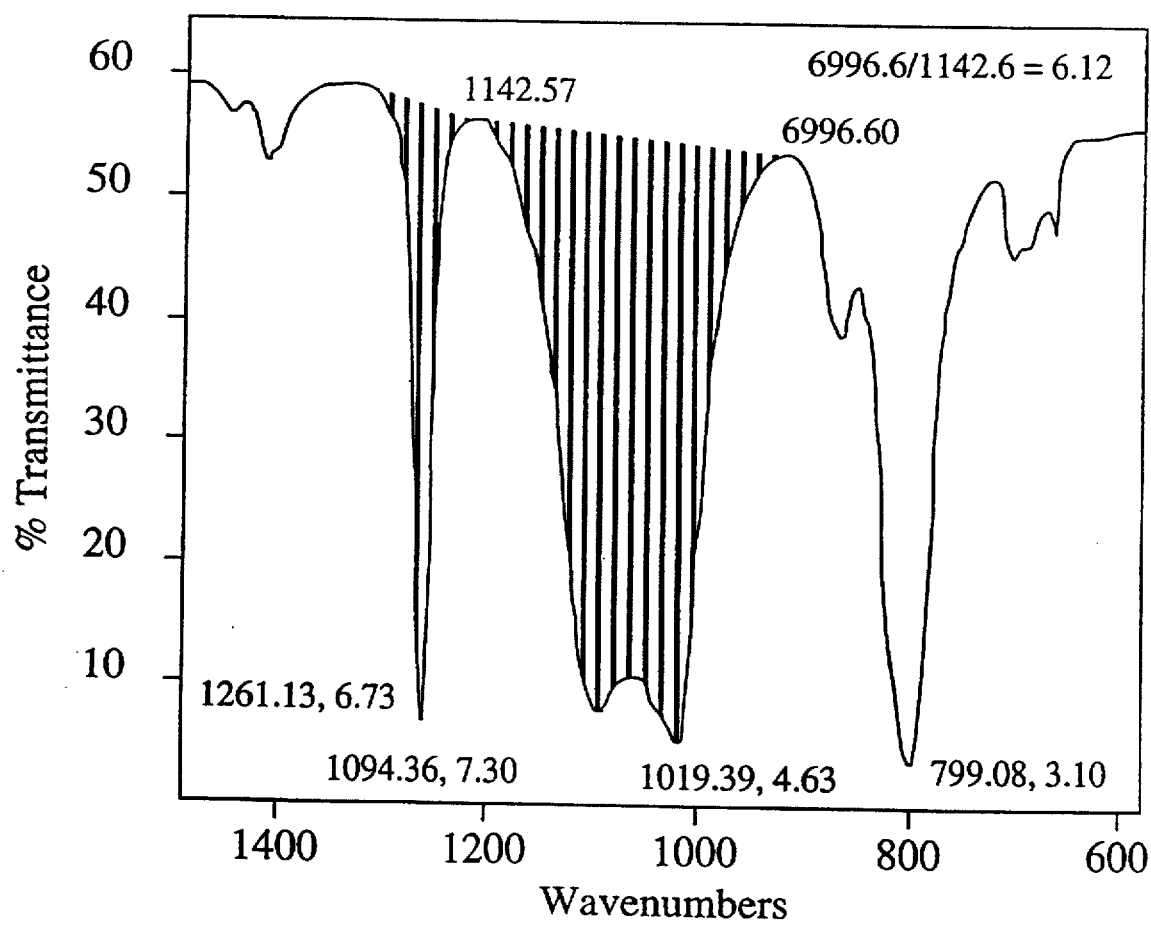

Polymer-coated KBr pellets were analyzed by FT-IR as shown in FIGS. 2—7. The vibration patterns of the Si—O backbone and Si—C side chain bonds in the starting polydimethylsiloxane (FIG. 2) are practically identical with the corresponding absorption patterns of the cross-linked material (FIG. 3). Consequently, demethylation and main chain fragmentation processes do not appear to be significant during the oxygen-plasma treatments of this polymer under these conditions.

Figure 4:
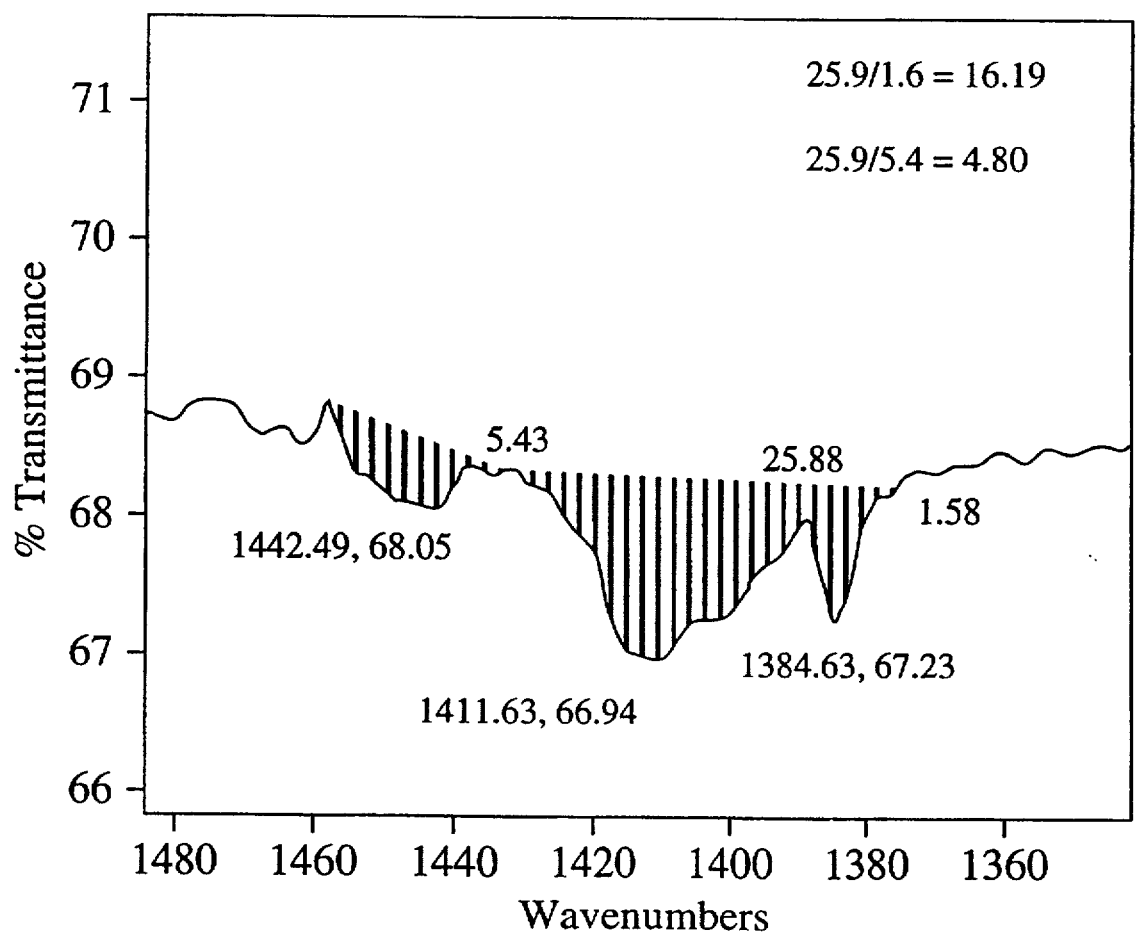
FIGS. 4 and 5 depict the FTIR vibration pattern of $CH_3$ in the starting polydimethylsiloxane and the plasma-treated polymer, respectively. After plasma-treatment, virtually all $CH_3$ groups disappear.
Figure 5:
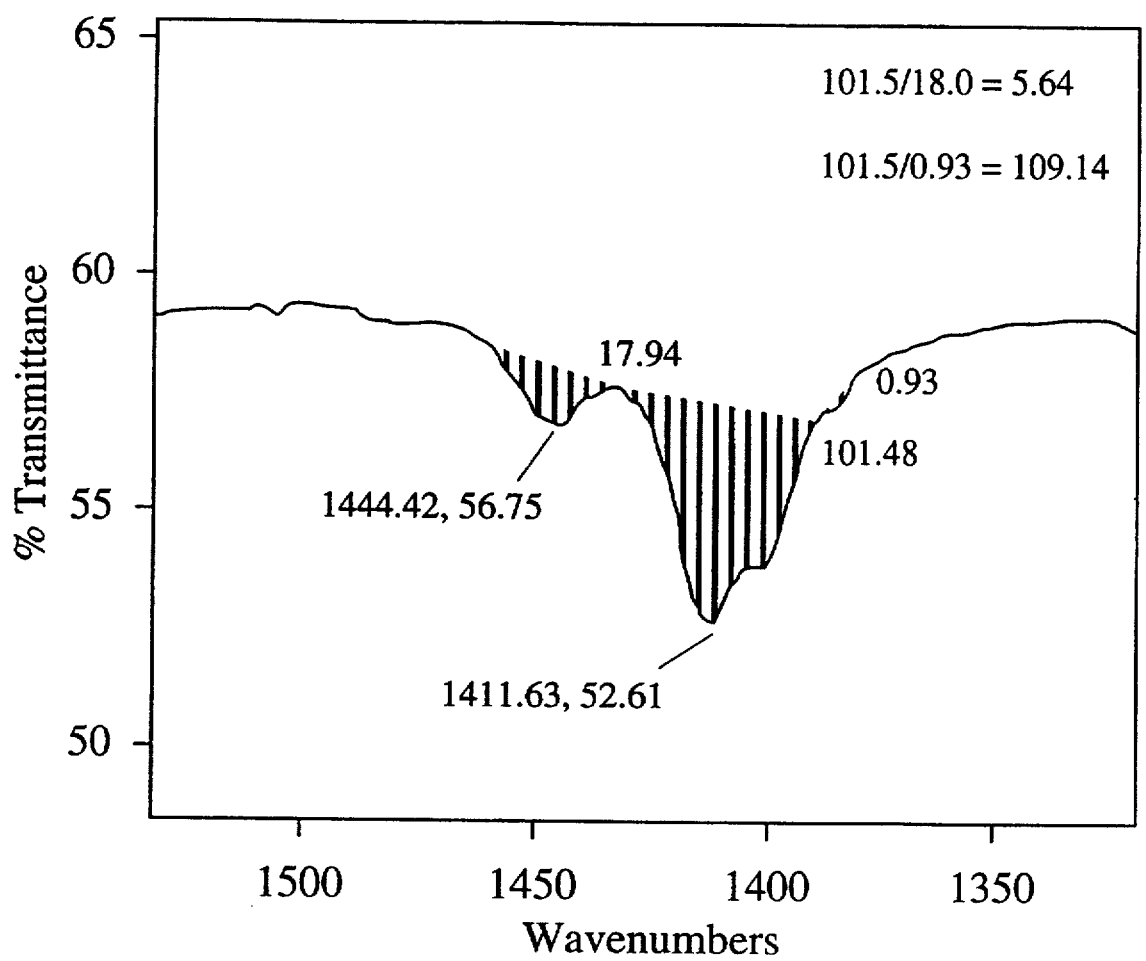

FIG. 4 depicts vibration of $CH_3$ at 1384 $cm^{-1}$ in the starting polydimethylsiloxane. FIG. 5 shows the same vibration in the cross-linked polymer. An almost total disappearance of $CH_3$ is observed in the cross-linked material.

Figure 6:
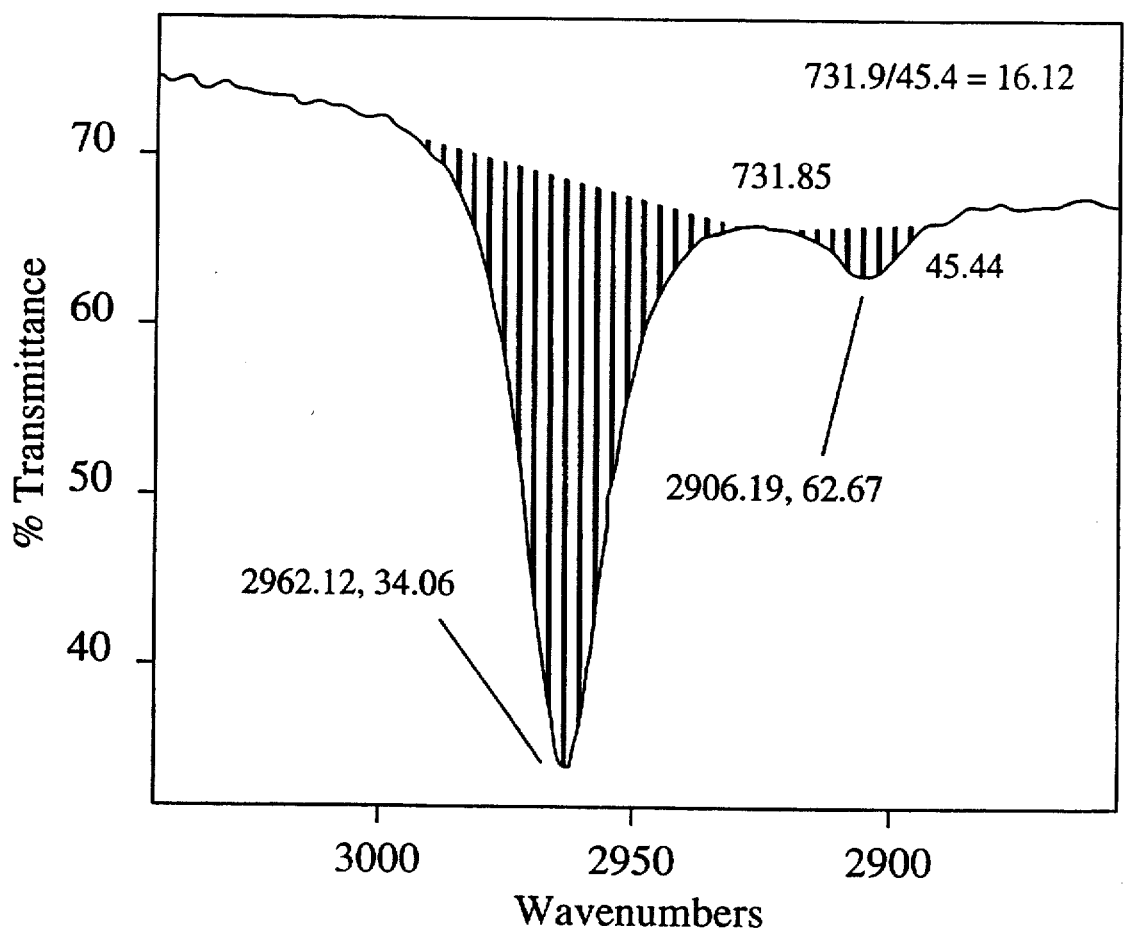
FIGS. 6 and 7 depict the relative ratio of $CH_2$ to $CH_3$ in the untreated and plasma-treated polydimethylsiloxane polymer.
Figure 7:
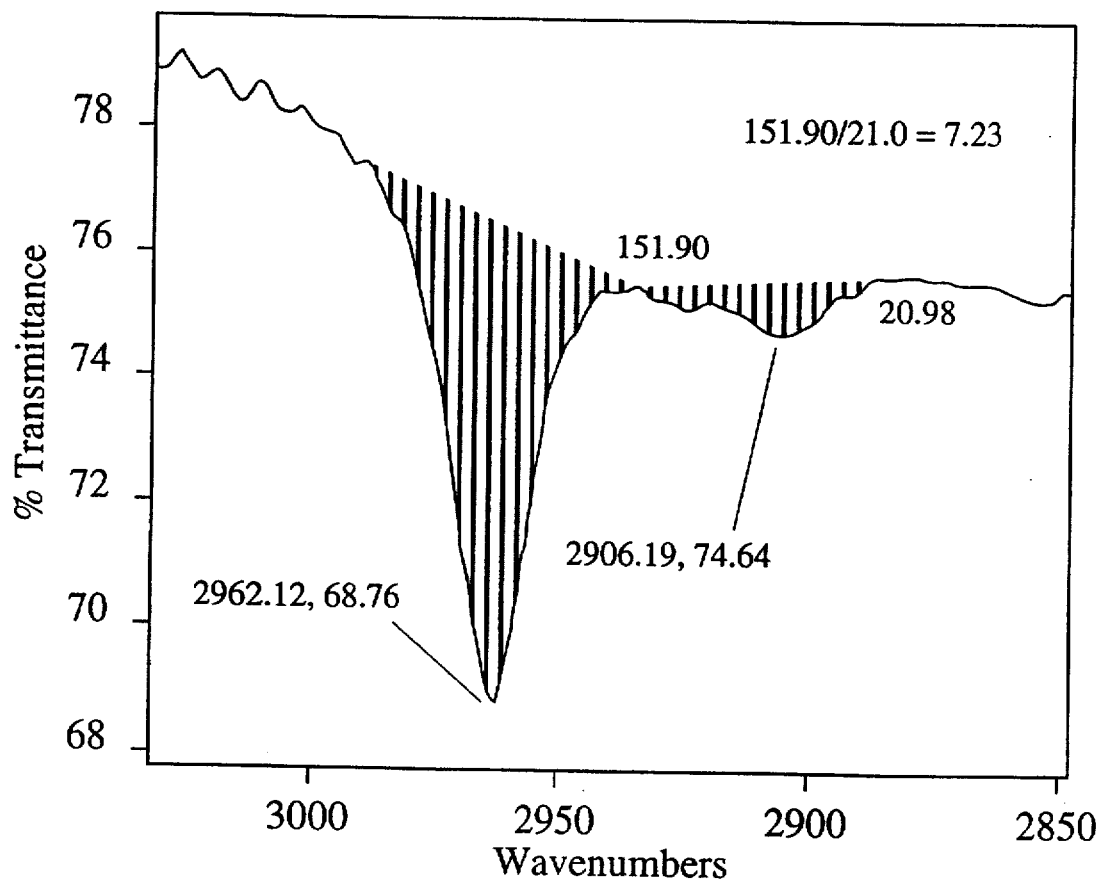

In FIG. 6 (plasma-modified polymer) and FIG. 7 (starting polydimethylsiloxane), the relative ratio of $CH_2/CH_3$ absorptions (2962 $cm^{-1}$/2907 $cm^{-1}$) are compared. It is apparent that the plasma treatment induces dehydrogenation of the polymers. The disappearance of $CH_3$ and the appearance of $CH_2$ shown in FIGS. 4–7 suggest the development of oxygen plasma-induced cross-linking through —$CH_2$—O—$CH_2$-ether bond formation. The solid nature of the plasma polymers and the increased thermal resistivity of the materials are also indirect proofs for the existence of a cross-linked network. Because of the superimposition of Si—O—Si and C—O—C absorptions, and also because of the predominance of siloxane bonds over ether linkages, the relative ratio of the two bond types is difficult to estimate by IR spectroscopy.

ESCA measurements (Table I) are in good agreement with the FT-IR data. An increased oxygen content is observed in the plasma-treated polymers when compared against the starting polydimethylsiloxane (PDMSiO). The increased oxygen content suggests the formation of cross-linking ether bonds during the reaction.

TABLE I

Surface atomic compositions (ESCA) of plasma synthesized polysiloxane-based polymeric thin film in comparison to standard PDMSiO

| Sample | Relative Atomic Composition % | | |
|---|---|---|---|
| | Si | O | C |
| Plasma-PSiO Polymer on Al (Shining Face) | 19.10 | 66.26 | 14.63 |
| Plasma-PSiO Polymer on Al (Matte Face) | 12.01 | 64.13 | 23.75 |
| Standard PDMSiO | 25 | 25 | 50 |

Comparative DTA-TG data of standard polydimethylsiloxane (viscosity equals 100,000) and plasma-generated polymeric layers, carried out under nitrogen atmospheric conditions, clearly indicate that oxygen-plasma-induced cross-linking reactions occurred. Plasma polymers deposited on silicon or on aluminum substrates exhibited a significantly higher thermal stability than standard polydimethylsiloxane. Plasma polymeric samples deposited on aluminum substrates began to decompose at about 340° C. while standard samples began to decompose at about 290° C. A significant endothermic effect was also noticed in the case of plasma-synthesized samples. This phenomenon is clearly associated with the decomposition of cross-linked structures.

These examples demonstrate the advantages of the novel materials of the present invention. However, the invention is not intended to be limited to the embodiments described herein, but rather to embrace all such variations and modifications thereof as come within the scope of the following claims.

We claim:

1. A composition of matter comprising a substrate and a coating adhered to the substrate, the coating comprising polymer chains of form

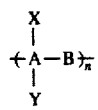

where A is silicon, phosphorus, sulfur, boron or carbon, B is oxygen, carbon, or nitrogen, X and Y are selected from the group consisting of hydrogen, an aliphatic group, an aromatic group, and a halogen, and n is 5 or more, the polymer chains being cross-linked, each cross-linked polymer chain having a linear backbone (-A-B-) repeated n times, wherein the cross-linked polymer chains have a backbone structure substantially identical in length to the polymer chain backbone, the coating being solvent-free and substantially free of fractured polymer chain backbones.

2. A composition of matter claimed in claim 1 wherein the coating forms an airtight barrier on the substrate.

3. A composition of matter as claimed in claim 1 wherein the substrate is selected from the group consisting of a metal, glass, paper, a synthetic polymer, silicon, alumina, quartz, potassium bromide, and a ceramic.

4. A composition of matter as claimed in claim 1 wherein the polymer chain is selected from the group consisting of a polysiloxane, a polyolefin, a paraffin oil, a polysulfone, a polysulfide, a polysilazene, polyethers and a polyphosphazene.

5. A composition of matter as claimed in claim 1 wherein the coating comprises a cross-linked polysiloxane.

6. A composition of matter as claimed in claim 1 wherein the coating comprises cross-linked polydimethylsiloxane.

7. A composition of matter as claimed in claim 1 wherein the coating has a dielectric constant below 3.

8. A composition of matter as claimed in claim 1 further comprising a dopant material in the coating.

9. A composition of matter as claimed in claim 8 wherein the dopant alters the non-linear optical properties of the coating.

10. A composition of matter as claimed in claim 8 wherein the dopant is a dye.

11. A composition of matter as claimed in claim 8 wherein the dopant is a fluorescent dye.

12. An optical component having a surface coating layer comprising polymer chains of form

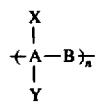

where A is silicon, phosphorus, sulfur, boron or carbon, B is oxygen, carbon, or nitrogen, X and Y are selected from the group consisting of hydrogen, an aliphatic group, an aromatic group, and a halogen, and n is 5 or more, the polymer chains being cross-linked, each cross-linked polymer chain having a linear backbone (-A-B-) repeated n times, wherein the cross-linked polymer chains have a backbone structure substantially identical in length to the polymer chain backbone, the coating being solvent-free and substantially free of fractured polymer chain backbones.

13. An optical component as claimed in claim 12 that exhibits non-linear optical effects.

14. A microelectronic component comprising a cross-linked layer comprising polymer chains of form

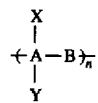

where A is silicon, phosphorus, sulfur, boron or carbon, B is oxygen, carbon, or nitrogen, X and Y are selected from the group consisting of hydrogen, an aliphatic group, an aromatic group, and a halogen, and n is 5 or more, the polymer chains being cross-linked, each cross-linked polymer chain having a linear backbone (-A-B-) repeated n times, wherein the cross-linked polymer chains have a backbone structure substantially identical in length to the polymer backbone, the coating being solvent-free and substantially free of fractured polymer chain backbones.

* * * * *